(No Model.)
H. C. CARTER.
EXCAVATING MACHINE.
No. 292,468. Patented Jan. 29, 1884.
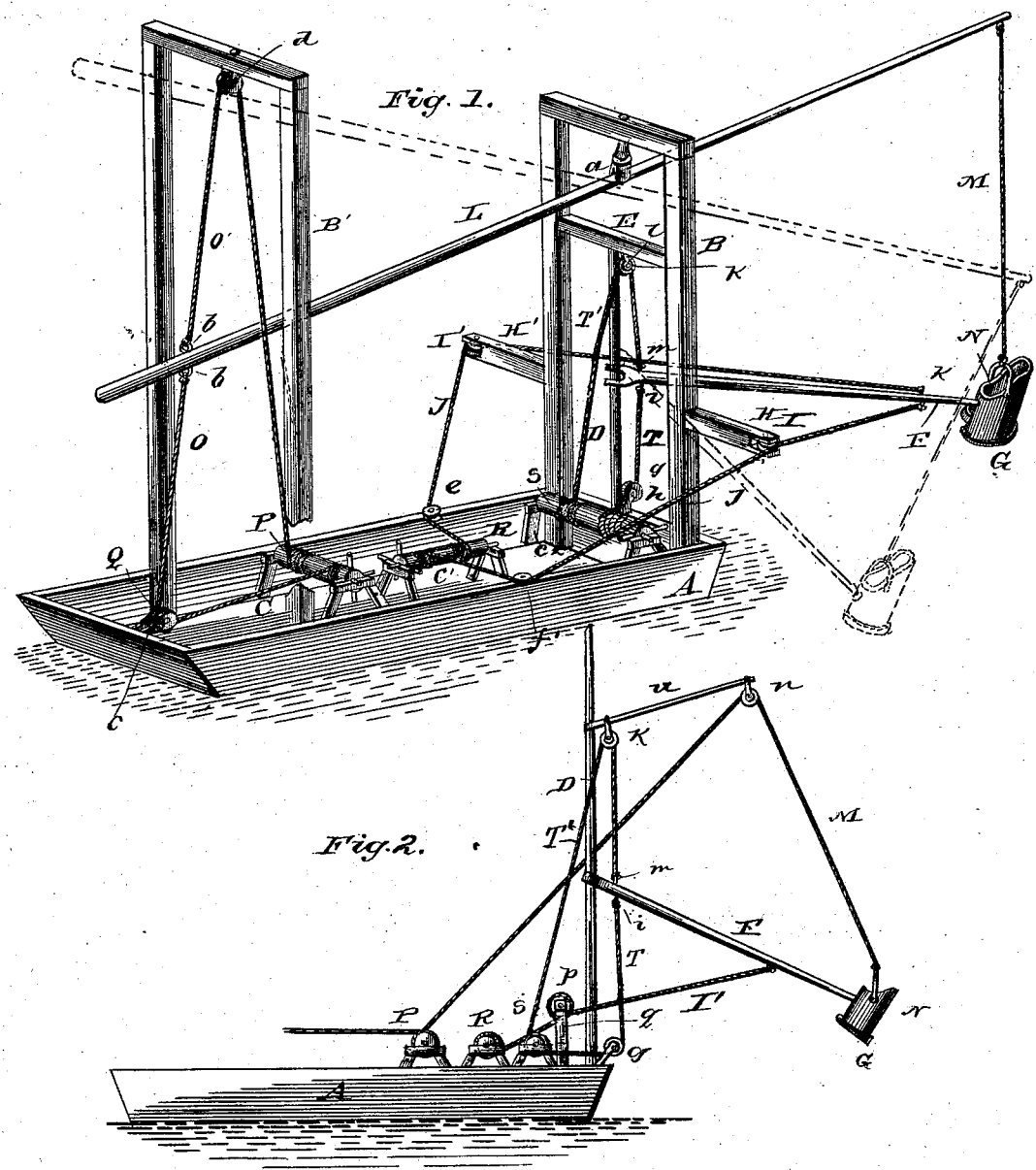
Witnesses:
Phil C. Dietrich
W. R. Heyworth
Inventor:
Henry C. Carter
by
J. S. Smith & Co.
Attorneys.

UNITED STATES PATENT OFFICE.

HENRY CLAY CARTER, OF FAIRFIELD, NORTH CAROLINA.

EXCAVATING-MACHINE.

SPECIFICATION forming part of Letters Patent No. 292,468, dated January 29, 1884.

Application filed September 19, 1883. (No model.)

*To all whom it may concern:*

Be it known that I, HENRY CLAY CARTER, a citizen of the United States, residing at Fairfield, in the county of Hyde and State of North Carolina, have invented certain new and useful Improvements in Excavating-Machines; and I do hereby declare the following to be a full, clear, and exact description of the invention, such as will enable others skilled in the art to which it appertains to make and use the same.

This invention relates to certain improvements in dredging or excavating machines, as hereinafter described and claimed.

In the drawings, Figure 1 shows in perspective a flat-boat with my improvements in position thereon, the parts being shown in the position they would assume during the upward movement of the dredging-bucket. Fig. 2 represents a side view of a modification of my invention with the bucket in the act of descending.

A represents an ordinary flat-boat or scow, having at or near either end uprights B B', and on the bottom at suitable intervals trestles C C' C².

D represents a mast or standard, supported at its lower end in the boat, and at its upper end in a cross-beam, E.

F represents an arm or lever, having its rear end of forked or other suitable shape, to adapt it to connect with the mast, with capability of sliding vertically thereon. To the outer end of this arm or lever is attached the bucket G.

H H' represent arms or timbers extending horizontally from the outer sides of the upright B. These arms or timbers have slotted outer ends, within which are journaled sheaves or rollers O, over which a rope or chain, J, passes from the windlass R to suitable eyes, K, on the arm F, as will be presently described.

L represents a boom, which is connected at its front end by means of a rope or chain, M, with the bail N of the bucket G, said boom being pivoted at *a* in a hanger depending from the under side of the top beam of the upright B, its rear end being connected by means of eyes *b* with ropes O O', the latter passing over the sheave or pulley *d*, depending from the under side of the top beam of the upright B'.

P represents a windlass journaled within or upon the trestle C, and to this windlass is connected one end of each of the ropes O O'. The rope O passes over said windlass to and around a sheave or pulley, Q, journaled within a bracket, *c*, attached to the rear end of the boat or scow A, and from thence passes up to and is secured within the eye *b* on the lower end of the boom L. The rope O' passes upward from windlass P to and around the sheave or pulley *d*, and from thence downward to an eye, *b*, on the upper side of the boom L. Consequently, by turning the windlass P in one direction, the rope O will be coiled around said windlass and draw down the lower ends of the boom L, and on turning the windlass or drum P in the opposite direction the rope O' will be correspondingly coiled around said windlass, and will draw the rear end of said boom upward. As the rear end of this boom rises or falls by reason of its pivotal connection *a*, a reverse motion will be imparted to the front end, by which means the bucket will either be raised or permitted to descend, as required.

R represents another windlass or drum, mounted upon the trestle C', around which the ropes J J' are coiled, the rope J passing around a sheave or pulley, *e*, to the pulley I', and the rope J' around the corresponding pulley, *f*, to the pulley I. The outer ends of these ropes J J' are attached to the arm F, which arm slides vertically at its inner portion on the standard D, and as this drum R is turned so as to coil the rope J upon the drum the bucket will be swung to one side, and as the rope J' is coiled upon said drum it will be swung to the opposite side. This operation permits of the dumping of the contents of the bucket upon the bank at either side of the river, as desired.

S represents another windlass or drum, mounted upon the trestle C². Upon this drum S are coiled the two ropes T T', the rope T passing around a sheave or pulley, *g*, journaled upon a bracket, *h*, to an eye, *i*, on the under side of the arm F, the rope T' passing from drum S to and over a sheave or pulley, *k*, journaled in a hanger, *l*, depending from the cross-beam E to an eye, *m*, on the upper side of the arm F. By this means, upon turning the windlass or drum S in one direction, the arm F, with its attached bucket, will be drawn downward upon the mast D, while by turning said drum in the opposite direction said arm F will be slid upward upon said mast.

The windlasses or drums P, R, and S are shown as supplied with spokes, by means of which they can be rotated by hand; but horse-power or any other suitable means may be adopted for operating the same as desired.

In the modification shown in Fig. 2 the mast D is simply supported at its base in the boat, and the uprights B B', arms H H', and boom L are dispensed with. In lieu thereof a short forwardly-extending arm, U, is attached to the mast at its upper end, to which the rope M, attached to the bucket-bail, is connected by means of the pulley $n$. This rope M passes over said pulley rearwardly to and around windlass P, its rear end being capable of attachment to suitable mule-power. The arm F is connected to the mast with capability of sliding vertically thereon, as before described, and the ropes or chains T T' attached by means of eyes $m$ and $i$, rope T' passing from the arm U, and from thence downwardly to and around windlass S, and the rope T passing downwardly and around the pulley $g$, and from thence to the windlass S, as heretofore described. The ropes J J' are connected to the arm F in a similar manner to that heretofore described; but in lieu of their passing over pulleys I I', journaled in the arms H H', they pass around pulleys $p$, journaled upon uprights $q$, and from thence pass to and around windlass R.

The operation of the device, as shown, for lowering and elevating the bucket and moving it sidewise in either direction, for the purpose of dumping the contents, is substantially the same in both arrangements. Upon the windlass S being rotated in one direction it will draw down the rope T, which, in its downward movement, will draw down the arm F, and thus depress the bucket. Then, upon the windlass P being revolved, the rope M will draw said bucket in an angular direction upward, so as to impart a scraping movement thereto. When the bucket is filled, the windlass S is rotated in the opposite direction, by which means the rope T' will be wound thereupon, and as its lower end rises it will draw the arm F with its attached bucket upward. Then the windlass R is revolved in either the one direction or the other, as it is desired to swing said arm and bucket to either the right or the left.

Having thus described my invention, what I claim therein, and desire to secure by Letters Patent, is—

1. In a ditching or excavating machine, the combination, with the bucket G, of a mast, D, arm F, adapted to slide vertically thereon at its rear end, and having suitable connection at its front end with the bucket rope or chain M, attached at one end to the bucket-bail, and boom or arm adapted to support said rope M, and windlass P, for operating said rope, substantially as and for the purpose set forth.

2. The combination, with arm F, of the ropes T T', pulleys $k$ $g$, and windlass S, substantially as and for the purpose set forth.

3. The combination of uprights B B', mast D, pivoted boom L, ropes O O', windlass P, and pulley Q, with arm F, bucket G, rope M, arms H H', pulleys I I', ropes T T', pulleys $k$ and $g$, and windlasses R and S, substantially as and for the purpose set forth.

In testimony whereof I affix my signature in presence of two witnesses.

HENRY CLAY CARTER.

Witnesses:
M. M. ROHRER,
MYER COHEN.